United States Patent
Roberts et al.

(10) Patent No.: US 9,137,482 B2
(45) Date of Patent: Sep. 15, 2015

(54) METHODS AND SYSTEMS FOR RESOLUTION-BASED MODIFICATION OF RECORDING INSTRUCTIONS ASSOCIATED WITH A SCHEDULED RECORDING OF A MEDIA CONTENT INSTANCE

(75) Inventors: Brian F. Roberts, Dallas, TX (US); Donald H. Relyea, Dallas, TX (US); Venkata S. Adimatyam, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 362 days.

(21) Appl. No.: 12/751,872

(22) Filed: Mar. 31, 2010

(65) Prior Publication Data

US 2011/0243535 A1  Oct. 6, 2011

(51) Int. Cl.
| | |
|---|---|
| *H04N 5/761* | (2006.01) |
| *H04N 5/775* | (2006.01) |
| *H04N 5/782* | (2006.01) |
| *H04N 21/433* | (2011.01) |
| *H04N 21/472* | (2011.01) |

(52) U.S. Cl.
CPC ............... *H04N 5/775* (2013.01); *H04N 5/782* (2013.01); *H04N 21/4334* (2013.01); *H04N 21/47214* (2013.01)

(58) Field of Classification Search
CPC ... H04N 5/775; H04N 5/782; H04N 21/4334; H04N 21/47214; H04N 5/765; H04N 5/76
USPC .......................................... 386/291, 292, 294
See application file for complete search history.

(56) References Cited

U.S. PATENT DOCUMENTS

| | | | |
|---|---|---|---|
| 2003/0198462 A1* | 10/2003 | Bumgardner et al. | 386/83 |
| 2005/0005300 A1* | 1/2005 | Putterman et al. | 725/89 |
| 2006/0222325 A1* | 10/2006 | Ellis | 386/83 |
| 2007/0033608 A1* | 2/2007 | Eigeldinger | 725/20 |
| 2007/0104456 A1* | 5/2007 | Craner | 386/83 |
| 2009/0028182 A1* | 1/2009 | Brooks et al. | 370/466 |
| 2009/0119701 A1 | 5/2009 | Aldrey et al. | |
| 2009/0119715 A1* | 5/2009 | Schwesinger et al. | 725/58 |
| 2010/0074593 A1* | 3/2010 | Jung | 386/83 |
| 2010/0150531 A1* | 6/2010 | Corry et al. | 386/123 |
| 2010/0158477 A1 | 6/2010 | Kummer | |
| 2010/0199301 A1 | 8/2010 | Hayashi et al. | |
| 2010/0316355 A1 | 12/2010 | Bumgardner et al. | |
| 2011/0102683 A1* | 5/2011 | Josephs | 348/731 |

* cited by examiner

*Primary Examiner* — William Tran

(57) ABSTRACT

An exemplary method includes maintaining recording instructions received from a user to automatically record a first resolution version of a media content instance scheduled to be transmitted during a first time period by way of a first content channel, determining that a second resolution version of the media content instance is scheduled to be transmitted during a second time period by way of a second content channel, presenting an option to the user to record the second resolution version of the media content instance instead of the first resolution version of the media content instance, and automatically modifying, in response to a selection of the option by the user, the recording instructions to record the second resolution version of the media content instance instead of the first resolution version of the media content instance. Corresponding methods and systems are also disclosed.

18 Claims, 11 Drawing Sheets

Scheduled Recordings

| Program | Type | Info | Resolution | |
|---|---|---|---|---|
| | | | 502-1 | 506 |
| Lost | Series | Mondays 3pm-4pm Ch. 110 | HD ←504 | SD |
| Steelers vs. Colts | Event | Sunday 6pm-10pm Ch. 013 | HD | SD  502-2 |
| SpongeBob | Series | Saturdays 11am-12pm Ch. 212 | HD  502-3 | SD |
| The Simpsons | Series | Thursdays 3pm-3:30pm Ch. 256 | - | SD  502-4 |

( Add )   ( Exit )

Scheduled Recordings

| Program | Type | Info | Resolution | |
|---|---|---|---|---|
| Lost | Series | Mondays 4pm-5pm Ch. 121 | HD | [SD] 502-1 |
| Steelers vs. Colts | Event | Sunday 6pm-10pm Ch. 013 | HD | [SD] 502-2 |
| SpongeBob | Series | Saturdays 11am-12pm Ch. 212 | [HD] 502-3 | SD |
| The Simpsons | Series | Thursdays 3pm-3:30pm Ch. 256 | - | [SD] 502-4 |

( Add )   ( Exit )

Space Manager

Used Space: 240 GB out of 250 GB. Check boxes next to programs currently scheduled to be recorded in HD to switch the scheduled recordings to SD.

| | Program | Type | Space Savings |
|---|---|---|---|
| 802-1 ☐ | Lost | Series | 2.5 GB/episode |
| 802-2 ☑ | SpongeBob | Series | 1.3 GB/episode |
| 802-3 ☑ | Sesame Street | Series | 1.5 GB/episode |
| 802-4 ☑ | Bowling Finals | Event | 7 GB |

Fig. 8

METHODS AND SYSTEMS FOR RESOLUTION-BASED MODIFICATION OF RECORDING INSTRUCTIONS ASSOCIATED WITH A SCHEDULED RECORDING OF A MEDIA CONTENT INSTANCE

BACKGROUND INFORMATION

The set-top box ("STB") has become an important device for accessing media content services and the media content within those services. It is not uncommon for an STB to include or to be used in conjunction with digital video recording ("DVR") technology, which may be used to record media content to permanent storage (e.g., a hard disk) for subsequent local access.

In some instances, a user of a DVR-enabled device may desire to modify a resolution in which a particular media content program scheduled for recording is recorded. For example, a user may initially provide the device with recording instructions configured to direct the device to automatically record episodes included in a particular television series in standard definition ("SD"). Subsequently, the user may desire to modify the recording instructions so that the device will record yet-to-be transmitted episodes within the television series in high definition ("HD"). In order to do so, a user has heretofore had to search for another content channel carrying the television series in HD, determine the time at which the television series is transmitted in HD, create a new set of recording instructions configured to direct the device to record the television series in HD, and delete the SD recording instructions. Such a process is unintuitive, difficult to perform, inconvenient, and/or time intensive for many users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5-9 illustrate exemplary graphical user interfaces ("GUIs") that may be presented according to principles described herein.

DETAILED DESCRIPTION OF PREFERRED EMBODIMENTS

Figure 1:
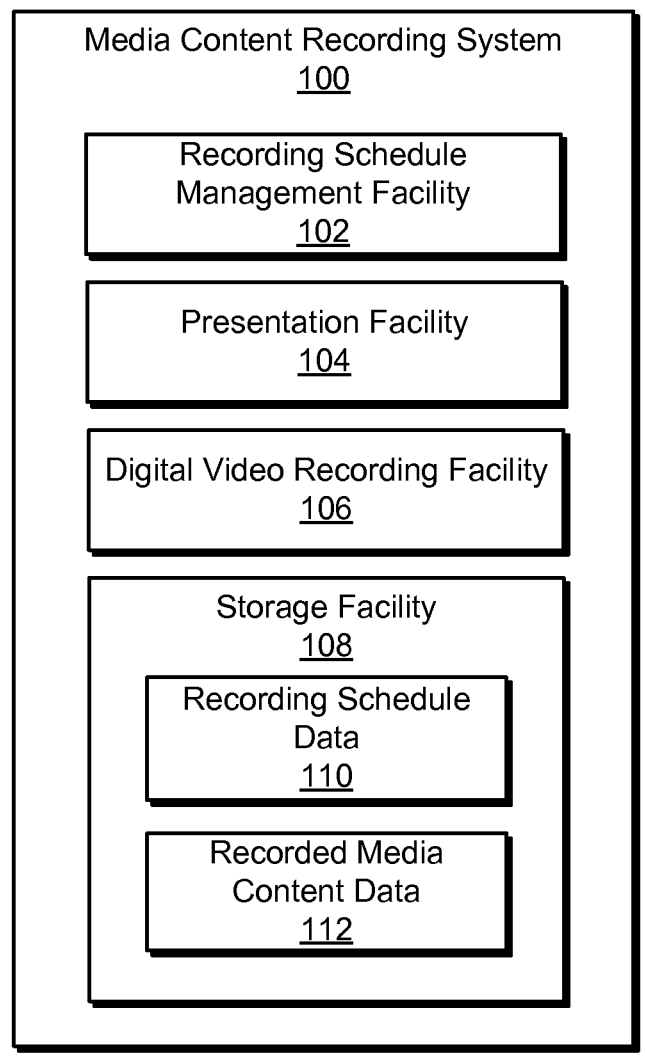
FIG. 1 illustrates an exemplary media content recording system according to principles described herein.

Methods and systems for resolution-based modification of recording instructions associated with a scheduled recording of a media content instance are described herein. As described in more detail below, a media content recording system may be configured to maintain recording instructions received from a user to automatically record a first resolution version (e.g., an SD resolution version) of a media content instance scheduled to be transmitted during a first time period by way of a first content channel. The media content recording system may be further configured to determine that a second resolution version (e.g., an HD resolution version or a three-dimensional ("3D") resolution version) of the media content instance is scheduled to be transmitted during a second time period by way of a second content channel, present an option to the user to record the second resolution version of the media content instance instead of the first resolution version of the media content instance, and automatically modify, in response to a selection of the option by the user, the recording instructions to record the second resolution version of the media content instance instead of the first resolution version of the media content instance.

As described in more detail below, the methods and systems described herein may facilitate automatic modification of recording instructions associated with a scheduled recording of a media content instance in response to a user-provided input command indicative of a desire to change a resolution in which the media content instance is to be recorded. In this manner, the cumbersome and often difficult process of creating a new set of recording instructions each time the user desires to change the resolution in which a media content instance is recorded may be avoided.

As used herein, the term "media content" may refer generally to any content made accessible by a media content delivery subsystem to a media content access subsystem. The term "media content instance" as used herein may refer generally to any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user.

As used herein, a "content channel" may refer to any channel by which media content may be delivered to a media content access subsystem (e.g., a set-top box device, a DVR device, or the like). A content channel may therefore include a broadcast, multicast, and/or narrowcast television channel, an Internet-Protocol ("IP") channel, and/or any other type of channel as may serve a particular implementation.

As used herein, a "standard definition" (or "SD") resolution refers to a 380i resolution. A "high definition" or ("HD") resolution refers to a resolution that is higher than an SD resolution (e.g., a 720p resolution, a 1080i resolution, and/or a 1080p resolution). Any other resolution may be considered standard definition or high definition as may serve a particular application.

FIG. 1 illustrates an exemplary media content recording system 100 (or simply "system 100"). As will be described in more detail below, system 100 may be configured to facilitate automatic resolution-based modification of recording instructions associated with a scheduled recording of one or more media content instances. System 100 may include, but is not limited to, a recording schedule management facility 102, a presentation facility 104, a digital video recording ("DVR") facility 106, and a storage facility 108. Each of these facilities will now be described in more detail.

Recording schedule management facility 102 may be configured to maintain (e.g., receive, store, modify, update, and/or otherwise process) recording instructions provided by a user. For example, recording schedule management facility 102 may be configured to receive recording instructions from a user to automatically record a first resolution version (e.g., an SD resolution version) of a media content instance scheduled to be transmitted during a first time period by way of a first content channel.

Recording schedule management facility 102 may be further configured to determine that a second resolution version (e.g., an HD resolution version) of the media content instance is scheduled to be transmitted during a second time period by way of a second content channel. The second time period may be substantially the same as the first time period. Alternatively, the second time period may be different than the first time period.

In response to a selection by the user of an option to record a second resolution version of the media content instance instead of the first resolution version of the media content instance, recording schedule management facility 102 may be configured to automatically modify the recording instructions to record the second resolution version of the media content instance instead of the first resolution version of the media content instance. Exemplary manners in which recording schedule management facility 102 may automatically modify recording instructions will be described in more detail below.

In some instances, a recording conflict may arise between the second resolution version of the media content instance and another media content instance already scheduled for recording during the second time period. Recording schedule management facility 102 may be configured to detect and facilitate resolution of the recording conflict. For example, recording schedule management facility 102 may be configured to direct presentation facility 104 to present to the user one or more conflict resolution options configured to resolve the recording conflict. Recording schedule management facility 102 may additionally or alternatively be configured to automatically resolve the recording conflict by selecting a different time period in which the second resolution version of the media content instance is recorded and/or in any other manner as may serve a particular implementation.

In some examples, recording schedule management facility 102 may be further configured to determine that an amount of available storage space used to store data representative of recorded media content instances is less than a predetermined threshold and direct presentation facility 104 to present the option to record a second resolution version of the media content instance instead of the first resolution version of the media content instance in response to the determination. In this manner, as will be described in more detail below, the number of media content instances that may be stored in the available storage space may be maximized.

Presentation facility 104 may be configured to present the option to the user to record a second resolution version of the media content instance instead of the first resolution version of the media content instance. The option may be presented in any suitable manner (e.g., by way of one or more graphical user interfaces ("GUIs"), as will be described in more detail below. Presentation facility 104 may be configured to present one or more other options, GUIs, notifications, etc. as may serve a particular implementation.

Presentation facility 104 may be additionally configured to present the media content instance in either the first or second resolution for experiencing by the user. Presentation of the media content instance may be performed in any suitable manner such as by generating and/or providing output signals representative of the media content instance to a display device (e.g., a television).

DVR facility 106 may be configured to facilitate temporary and/or permanent recording of selected media content to storage facility 108. For example, DVR facility 106 may be configured to record a transmitted media content instance in accordance with recording instructions received from a user.

DVR facility 106 may be further configured to facilitate "trick play," or non-linear, modes. For example, DVR facility 106 may be configured to receive and execute one or more commands input by a user that are configured to pause a presentation of a media content instance, resume a presentation of a media content instance, skip to a different position within a media content instance, fast forward within a media content instance, and/or rewind within a media content instance.

Storage facility 108 may be configured to maintain recording schedule data 110 utilized by recording schedule management facility 102 to schedule recordings of media content instances and recorded media content data 112 representative of media content recorded by DVR facility 106. It will be recognized that storage facility 108 may maintain additional or alternative data as may serve a particular application.

Figure 2:
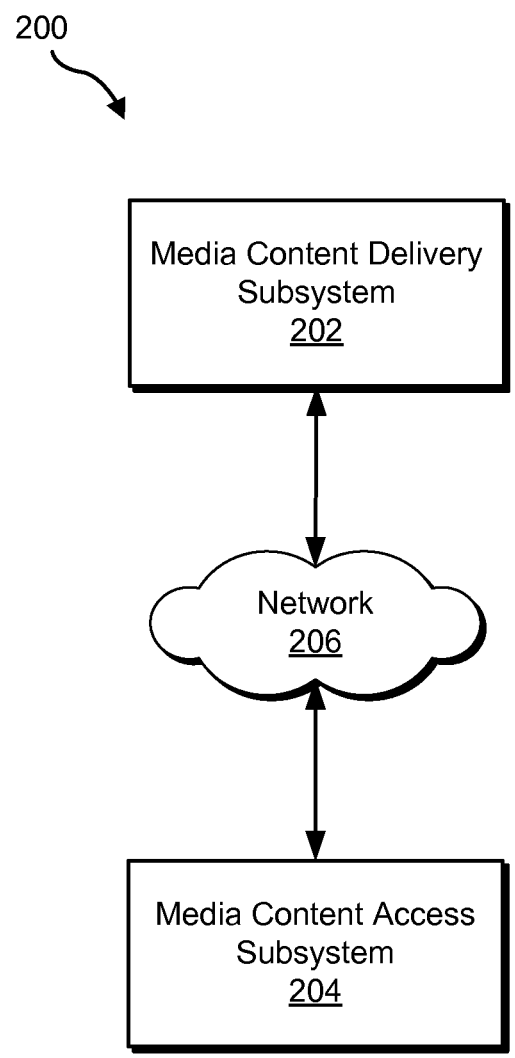
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). Any of the facilities 102-108 may be implemented on one or both of provider subsystem 202 and access subsystem 204.

Access subsystem 204 may be configured to communicate with and receive a signal and/or data stream containing data representative of media content and/or data associated with media content (e.g., metadata, program guide data, etc.) from provider subsystem 202. Access subsystem 204 and provider subsystem 202 may communicate using any suitable communication technologies, devices, networks, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection).

In some examples, provider subsystem 202 may be configured to generate or otherwise provide media content to access subsystem 204. Access subsystem 204 may be configured to facilitate access by a user to media content received from provider subsystem 202. To this end, access subsystem 204 may present the media content for experiencing (e.g., viewing) by a user, record the media content, and/or perform any other operation associated with the media content as may serve a particular implementation.

Figure 3:
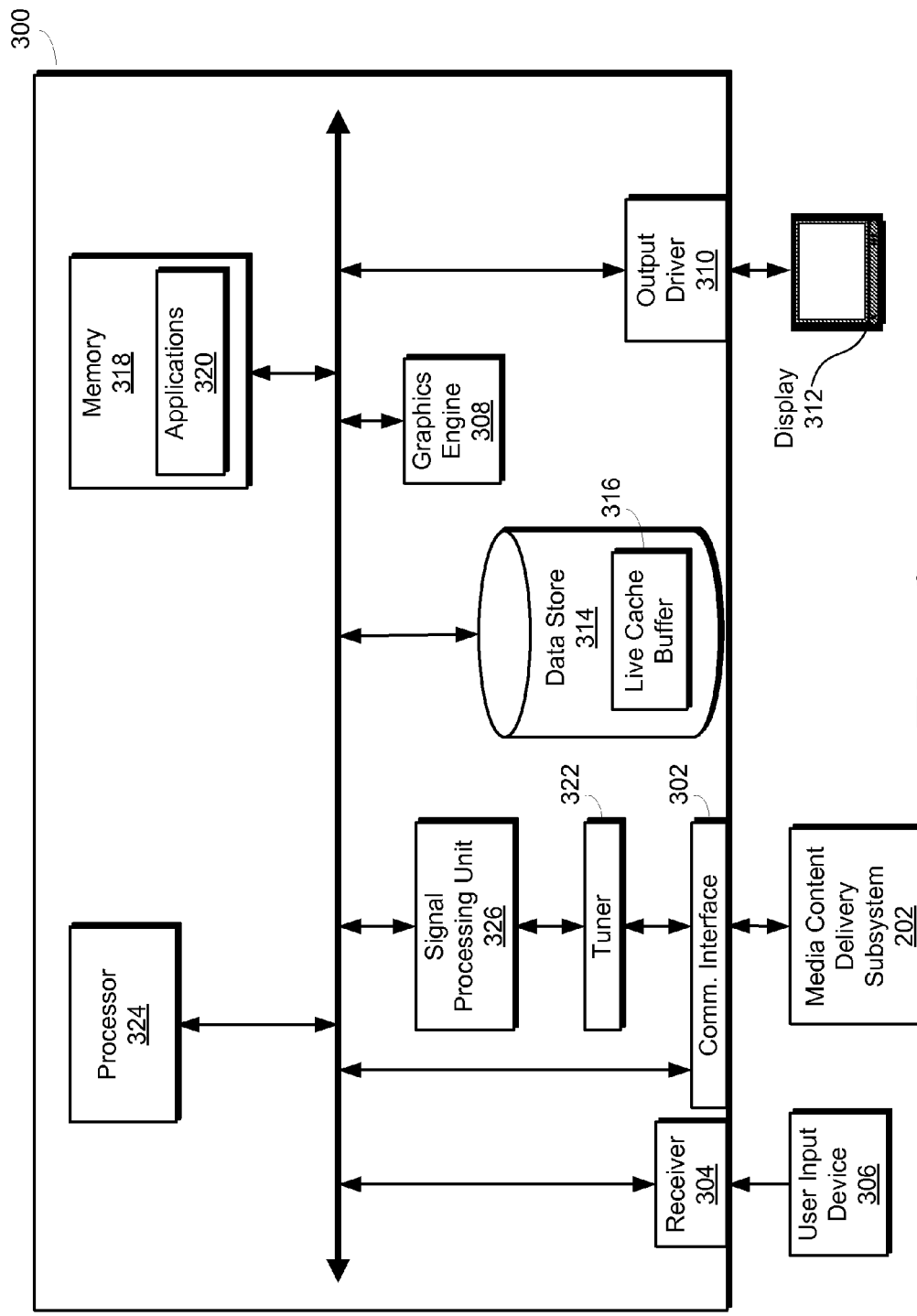
FIG. 3 illustrates an exemplary media content access device according to principles described herein.

Access subsystem 104 and/or components of access subsystem 104 may be implemented as may suit a particular application. FIG. 3 illustrates an exemplary media content access device 300 (or simply "device 300") having access subsystem 104 implemented thereon. Device 300 may include one or more of the components of access subsystem 104 shown in FIG. 3 and may be configured to perform one or more of the processes and/or operations described herein. Device 300 may include, but is not limited to, a set-top box device, a DVR device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 3, device 300 may include a communication interface 302 configured to receive media content (e.g., media content) and/or data (e.g., metadata, data representative of recording options, program guide data, and/or any other data associated with media content) in any acceptable format from delivery subsystem 102 or from any other suitable external source. Communication interface 302 may include any device, logic, and/or other technologies suitable for receiving signals and/or data representative of media content and/or other types of media content or data. Communication interface 302 may be configured to interface with any suitable communication media, protocols, and formats, including any of those mentioned above.

Device 300 may include a receiver 304 configured to receive user input signals from a user input device 306. User input device 306 may include, for example, a remote control device or any other suitable input device and may be configured to communicate with receiver 304 via a wireless link, electrical connection, or any other suitable communication link.

Device 300 may include a graphics engine 308 and an output driver 310. Graphics engine 308 may be configured to generate graphics to be provided to output driver 310, which may be configured to interface with or drive a display 312. Output driver 310 may provide output signals to display 312, the output signals including graphical media content (e.g., media content and/or program guide media content) generated by graphics engine 308 and to be presented by display 312 for experiencing by a user. For example, output driver 310 may provide data representative of a graphical user interface including a program guide view or a media playback view to display 312 for presentation to the user. Graphics engine 308 and output driver 310 may include any combination of hardware, software, and/or firmware as may serve a particular application.

Data store 314 may include one or more data storage media, devices, or configurations and may employ any type, form, and combination of storage media. For example, data store 314 may include, but is not limited to, a hard drive, network drive, flash drive, magnetic disc, optical disc, or other non-volatile storage unit. Media content and/or data associated with media content may be temporarily and/or permanently stored in data store 314.

Data store 314 is shown to be included within device 300 in FIG. 3 for illustrative purposes only. It will be understood that data store 314 may additionally or alternatively be located external to device 300.

Data store 314 may include one or more live cache buffers 316. Live cache buffer 316 may additionally or alternatively reside in memory 318 or in a storage device external to device 300. In some examples, media content data may be temporarily stored in live cache buffer 316 to facilitate recording of media content and/or presentation of media content in one or more trick play modes.

Device 300 may include memory 318. Memory 318 may include, but is not limited to, FLASH memory, random access memory ("RAM"), dynamic RAM ("DRAM"), other suitable computer-readable media, or any combination or subcombination thereof. In some examples, one or more applications 320 configured to run on or otherwise be executed by device 300 may reside in memory 318.

Device 300 may include one or more tuners 322. Tuner 322 may be configured to selectively receive media content carried on a particular content carrier such that the media content may be processed by device 300. In some examples, media content received by tuner 322 may be temporarily buffered, or stored, in the live cache buffer 316. If there are multiple tuners 322, there may be a live cache buffer 316 corresponding to each of the tuners 322.

While tuner 322 may be used to receive certain media content-carrying signals transmitted by delivery subsystem 102, device 300 may be configured to receive other types of media content signals (including media content signals and/or program guide data signals) from delivery subsystem 102 and/or one or more other sources without using a tuner. For example, delivery subsystem 102 may transmit digital streams of data packets (e.g., Internet Protocol ("IP") based data packets) that can be received without using a tuner. For such types of media content signals, communication interface 302 may receive and forward the signals directly to other components of device 300 (e.g., processor 324 or signal processing unit 326) without the signals going through tuner 322. For an IP-based signal, for example, signal processing unit 326 may function as an IP receiver.

Device 300 may include at least one processor, such as processor 324, configured to control and/or perform one or more operations of device 300. Device 300 may also include a signal processing unit 326 configured to process incoming media content. Signal processing unit 326 may be configured, for example, to demodulate and parse encoded digital media content. In some examples, device 300 may include one or more signal processing units 326 corresponding to each of the tuners 322.

Figure 4:
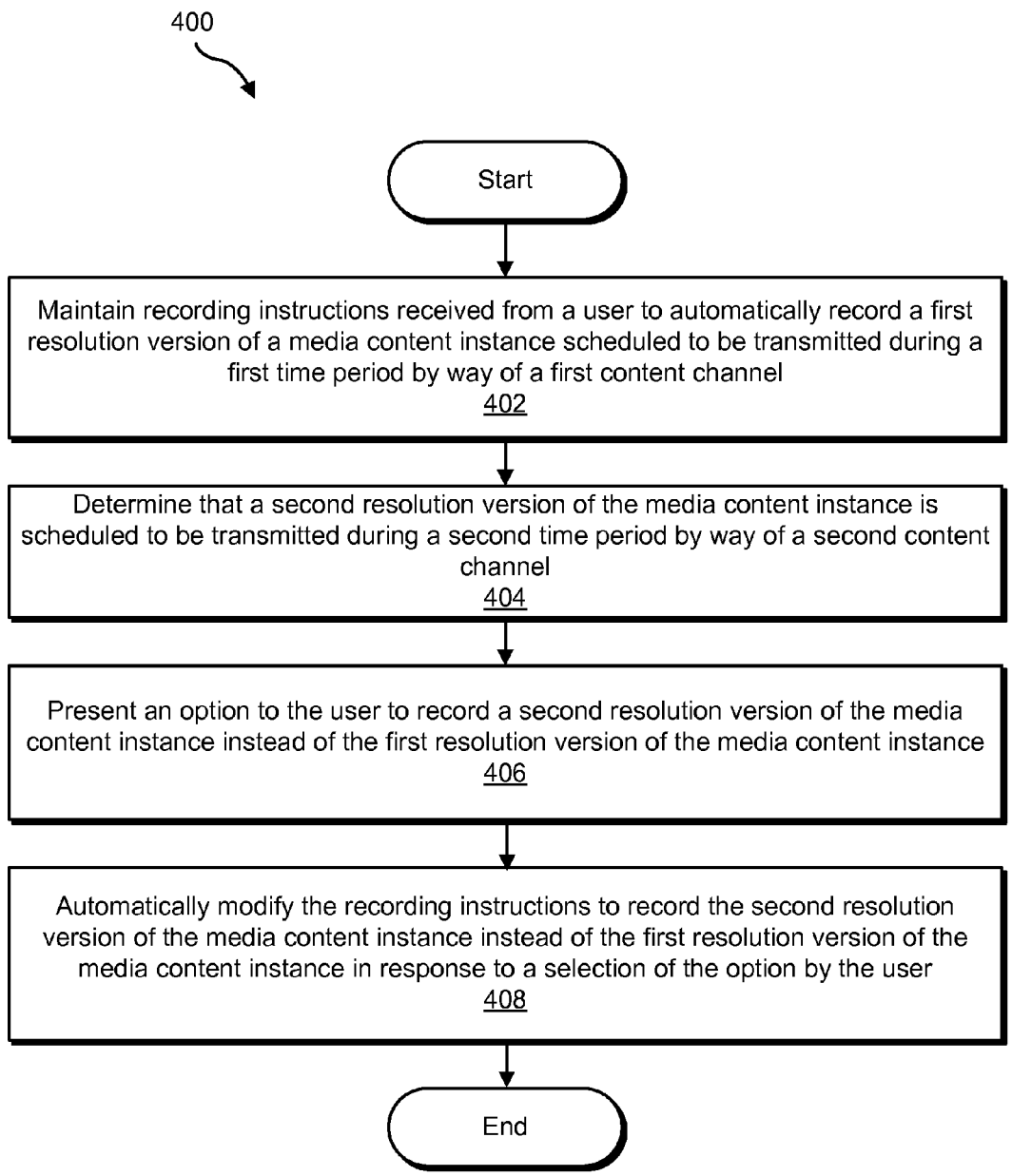
FIG. 4 illustrates an exemplary method of automatically modifying a resolution in which a media content instance scheduled for recording is to be recorded according to principles described herein.

FIG. 4 illustrates an exemplary method 400 of automatically modifying a resolution in which a media content instance scheduled for recording is to be recorded. While FIG. 4 illustrates exemplary steps according to one embodiment, other embodiments may omit, add to, reorder, and/or modify any of the steps shown in FIG. 4. The steps shown in FIG. 4 may be performed by any component or combination of components of system 100.

In step 402, recording instructions received from a user to automatically record a first resolution version of a media content instance scheduled to be transmitted during a first time period by way of a first content channel are maintained. The first resolution version of the media content instance may include an SD resolution version, an HD resolution version, a 3D resolution version, or any other resolution version as may serve a particular implementation. System 100 may be configured to maintain the recording instructions in any of the ways described herein.

In step 404, a determination is made that a second resolution version of the media content instance is scheduled to be transmitted during a second time period by way of a second content channel. The second resolution version of the media content instance may include any resolution version other than the first resolution version. For example, if the first resolution version is SD, the second resolution version may be HD or 3D. Alternatively, if the first resolution version is HD, the second resolution version may be SD or 3D.

In some examples, the second time period referred to in step 404 may be substantially the same as the first time period referred to in step 402. For example, different resolution versions of the same media content instance may be transmitted at substantially the same time by way of an SD content channel and an HD content channel. To illustrate, a sporting event may be transmitted at substantially the same time in both SD and HD by way of different content channels. Alternatively, the second time period may be different than the first time period. For example, a particular television program may be broadcast in SD and in HD at different times.

The determination performed in step 404 may be performed by system 100 in any suitable manner as may serve a particular implementation. For example, system 100 may determine that the second resolution version of the media content instance is scheduled to be transmitted by identifying the media content instance in a program guide and/or in any other data representative of a presentation schedule of the media content instance. Additionally or alternatively, system 100 may utilize a program identifier (e.g., a program ID number) associated with the media content instance to determine whether another content channel is scheduled to carry a media content instance with the same program identifier. If another content channel carrying the media content instance is identified, system 100 may determine whether the other content channel is configured to carry a second resolution version of the media content instance. It will be recognized that other determination heuristics may be used by system 100 to determine whether a second resolution version of the media content instance is scheduled to be transmitted by way of a second content channel during a second time period.

In step 406, an option is presented to the user to record the second resolution version of the media content instance instead of the first resolution version of the media content instance. The option may be presented by system 100 in any suitable manner as may serve a particular implementation. For example, the option may be presented by way of a graphical user interface, a pop-up window, an email or short message service ("SMS") message, and/or any other suitable presentation means as may serve a particular implementation. Exemplary manners in which the option may be presented will be described in more detail below.

In step 408, the recording instructions are automatically modified to record the second resolution version of the media content instance instead of the first resolution version of the media content instance in response to a selection of the option by the user. The recording instructions may be automatically modified in any suitable manner as may serve a particular implementation. Exemplary manners in which system 100 may modify the recording instructions will be described in more detail below.

Exemplary GUIs that may be presented to a user in order to implement the systems and methods described herein will now be described. It will be recognized that the GUIs described herein are merely illustrative of the many possible implementations of the systems and methods described herein.

FIG. 5 illustrates an exemplary GUI 500 that may be presented by system 100 to a user in order to facilitate management of one or more scheduled recordings of media content instances. The information presented in GUI 500 is merely illustrative and may be modified and/or added to as may serve a particular implementation.

GUI 500 may be configured to allow a user to view, modify, and/or otherwise access recording instructions maintained by system 100. To illustrate, GUI 500 shows that a user has scheduled a series entitled "Lost" for recording on Mondays between 3:00 pm and 4:00 pm on channel 110, a "Steelers vs. Colts" football event for recording on Sunday between 6:00 pm and 10:00 pm on channel 013, a series entitled "SpongeBob" on Saturdays between 11:00 am and 12:00 pm on channel 212, and a series entitled "The Simpsons" on Thursdays between 3:00 pm and 3:30 pm on channel 256. It will be recognized that additional or alternative information associated with each scheduled recording may be included in GUI 500.

In some examples, the initial recording instructions provided by the user also indicate the resolution in which the media content instances listed in GUI 500 are to be recorded. The resolution may be indicated specifically by the user or indirectly indicated based on the content channel selected by the user. For example, in providing the recording instructions for the series entitled "Lost", the user may merely indicate that the resolution version of the episodes included in the "Lost" series carried by channel 110 (which may be an HD channel, for example) is to be recorded by system 100.

System 100 may be configured to determine all available resolutions in which the media content instances listed in GUI 500 may be recorded. The determination may be performed in any of the ways described herein. The available resolutions, including the resolution initially selected by the user and any additional available resolutions, may be presented in GUI 500, as shown in FIG. 5.

To illustrate, system 100 may determine that the "Lost" series, the "Steelers vs. Colts" football event, and the "SpongeBob" series shown in FIG. 5 are all available for recording is either HD or SD, while "The Simpsons" series is only available in SD. The available resolutions may be presented in GUI 500, as shown in FIG. 5.

In some examples, an option may be presented to the user within GUI 500 to modify a resolution in which one or more of the media content instances listed in GUI 500 are to be recorded. The option may be presented in the form of a positionable selection box 502 (e.g., selection boxes 502-1 through 502-4) that may be selectively positioned over an HD graphic (e.g., graphic 504) representative of an HD recording option or an SD graphic (e.g., graphic 506) representative of an SD recording option. It will be recognized that other recording options may additionally or alternatively be presented in GUI 500 as may serve a particular application.

To illustrate, FIG. 5 shows selector box 502-1 positioned over HD graphic 504, thus indicating that system 100 will record the "Lost" series in HD. If, at some future time, the user desires to instead record the "Lost" series in SD, the user may simply reposition selection box 502-1 over SD graphic 506, as illustrated in FIG. 6. In response to the repositioning of selection box 502-1 over SD graphic 506, system 100 may automatically modify the recording instructions associated with the "Lost" series to record the SD resolution version of the "Lost" series instead of the HD resolution version. For example, system 100 may update the recording instructions with a new channel identifier that corresponds to the content channel carrying the SD resolution of the "Lost" series and a new time period in which the SD resolution version of the "Lost" series is to be transmitted by way of the content channel. By automatically modifying the recording instructions in this manner, the user does not have to go through all the steps involved in establishing a new recording schedule for the SD resolution version of the "Lost" series.

In some examples, the recording information displayed in GUI 500 may be automatically updated in response to the user selecting a different resolution in which a media content instance scheduled to be recorded is recorded. For example, FIG. 6 shows that GUI 500 has been updated to display modified recording information associated with the selected SD resolution (e.g., information conveying that that the SD resolution version is to be recorded on Mondays between 4:00 pm and 5:00 pm on channel 121).

In some examples, the "info" column shown in FIGS. 5 and 6 may be omitted from GUI 500. In this manner, a user may direct system 100 to modify recording instructions associated with a media content instance without viewing (and, in some instances, without worrying about) when and by what content channel alternative resolution versions associated with the media content instance are to be transmitted.

Figure 7:
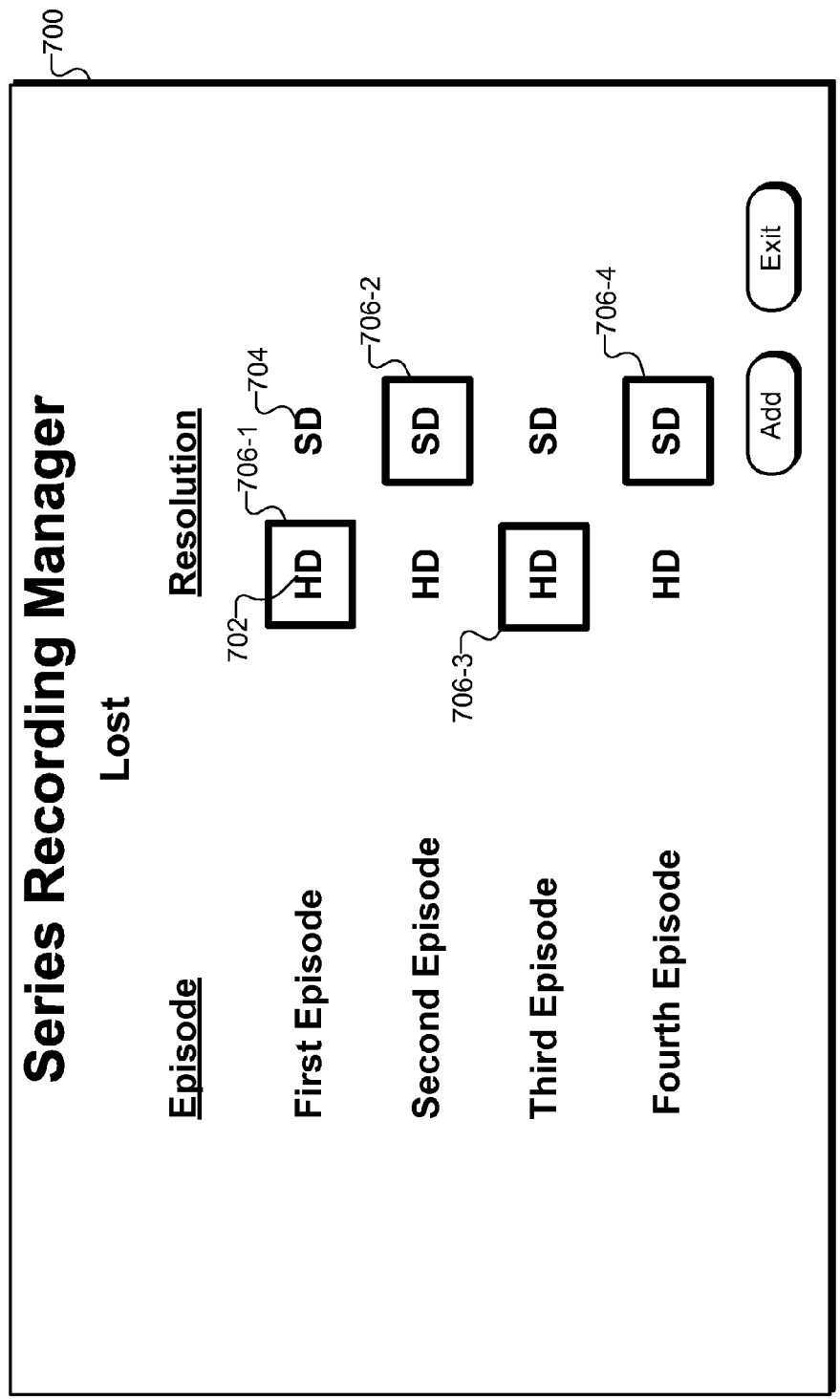

FIG. 7 illustrates another exemplary GUI 700 that may be presented to the user in order to facilitate resolution-based modification of recording instructions associated with one or more media content instances scheduled for recording. GUI 700 may be configured to facilitate resolution-based modification of recording instructions associated with specific episodes included in a program series (e.g., "Lost").

As shown in FIG. 7, GUI 700 includes a list of episodes included in the "Lost" series. Graphical representations (e.g., HD graphic 702 and SD graphic 704) of all available resolutions associated with each episode may also be presented in GUI 700, as shown in FIG. 7. A user may selectively position one or more of selection boxes 706 (e.g., selection boxes 706-1 through 706-4) over a desired graphical representation in order to direct system 100 to record each of the listed episodes in either HD or SD. For example, FIG. 7 shows that the user has directed system 100 to record the first and third episodes in HD and the second and fourth episodes in SD.

FIG. 8 illustrates an exemplary GUI 800 that may be presented by system 100 in response to a determination by system 100 that an amount of available storage space used to store data representative of recorded media content instances is less than a predetermined threshold. Options in the form of checkboxes 802 (e.g., checkboxes 802-1 through 802-4) may be presented within GUI 800 to downgrade the resolution in which one or more media content instances are scheduled to be recorded in order to maximize the number of media content instances that may be stored by the available storage space.

For example, storage facility 108 may be implemented by a hard drive having a capacity of 250 GB. The predetermined threshold may be 10 GB (or any other suitable amount). When the amount of used storage space within the hard drive is greater than 240 GB, GUI 800 may be automatically presented. Additionally or alternatively, GUI 800 may be presented in response to a user request. The user may select one or more of the media content instances listed in GUI 800 in order to maximize the number of media content instances that may be stored in the remaining amount of available storage space within the hard drive. To illustrate, FIG. 8 shows that the user has selected to downgrade the resolution in which a "SpongeBob" series, a "Sesame Street" series, and a "Bowling Finals" event are to be recorded.

Figure 9:
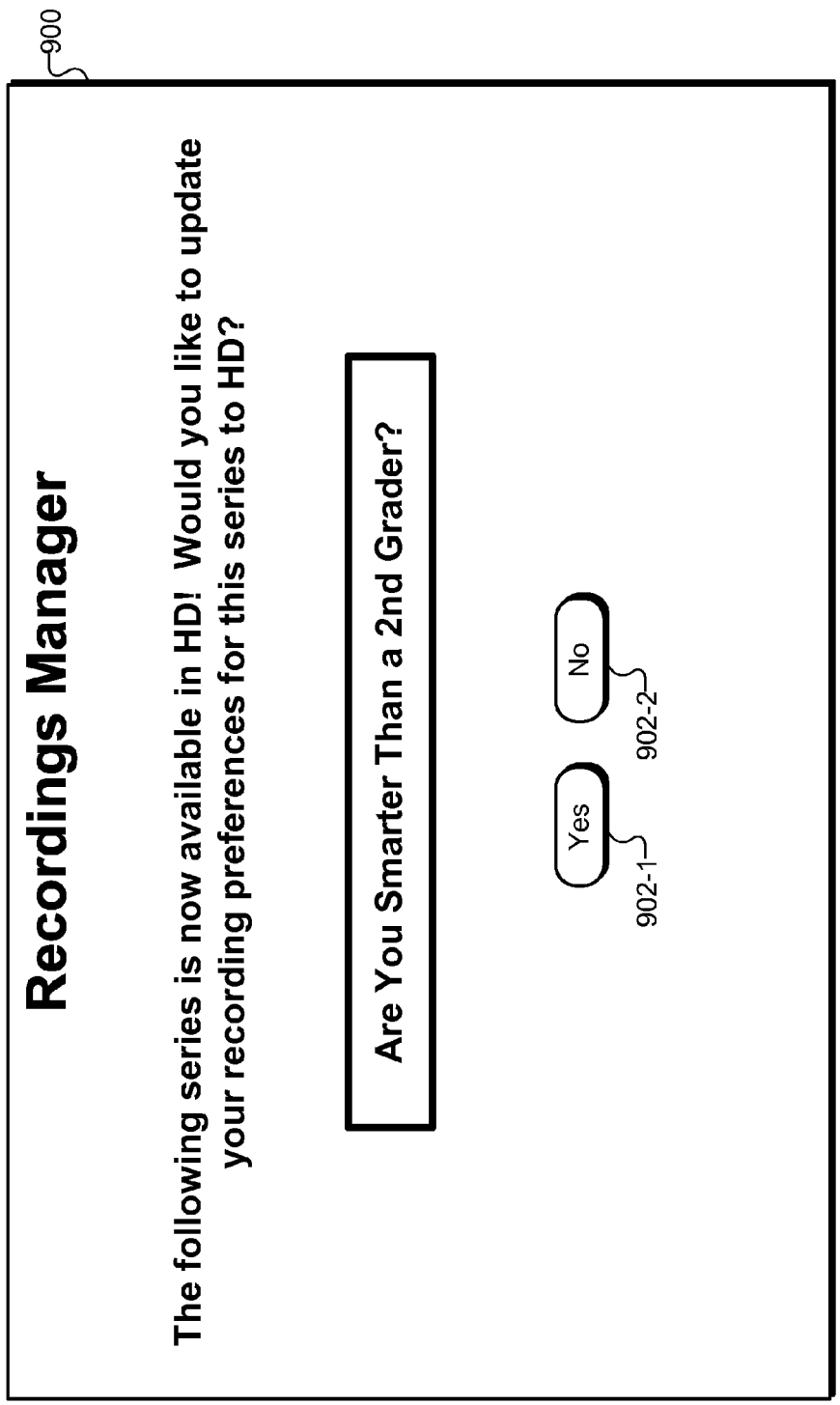

In some examples, system 100 may be configured to automatically present an option to modify a resolution in which a media content instance scheduled for recording is recorded when a new resolution of the media content instance becomes available. For example, FIG. 9 illustrates an exemplary GUI 900 that may be presented to a user when a series entitled "Are You Smarter Than a Second Grader?" originally scheduled to be recorded in SD becomes available in HD. The user may select a "yes" option 902-1 to direct system 100 to automatically change the resolution in which the scheduled series is to be recorded. Alternatively, a "no" option 902-2 may be selected by the user in order to prevent system 100 from making any such modification.

In some examples, system 100 may be configured to present an option to modify a resolution in which a media content instance scheduled for recording is recorded in the form of an email, SMS message, and/or other text-based notification. For example, system 100 may be configured to send an email to the user notifying the user that a new resolution of the media content instance becomes available. The email may include one or more links, for example, that may be selected by the user to direct system 100 to automatically change the resolution in which the scheduled media content instance is to be recorded.

Figure 10:
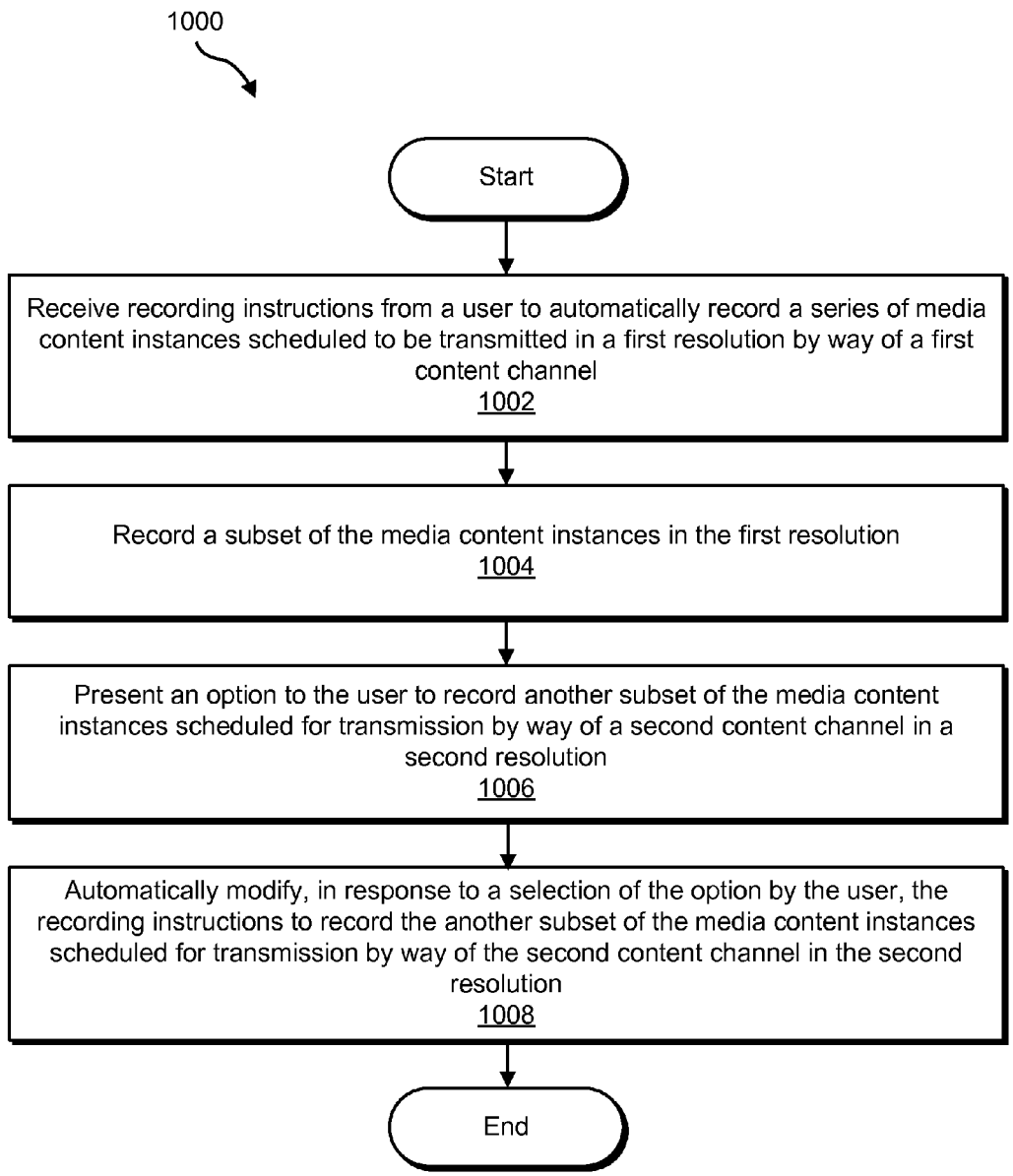
FIG. 10 illustrates an exemplary method of automatically modifying a resolution in which a series of media content instances scheduled for recording is to be recorded according to principles described herein.

FIG. 10 illustrates an exemplary method 1000 of automatically modifying a resolution in which a series of media content instances scheduled for recording is to be recorded. While FIG. 10 illustrates exemplary steps according to one embodiment, other embodiments may omit, add to, reorder, and/or modify any of the steps shown in FIG. 10. The steps shown in FIG. 10 may be performed by any component or combination of components of system 100 and/or a device (e.g., a DVR device) implementing system 100.

In step 1002, recording instructions are received from a user to automatically record a series of media content instances scheduled to be transmitted in a first resolution by way of a first content channel. Step 1002 may be performed in any of the ways described herein.

In step 1004, a subset of the media content instances is recorded in the first resolution. Step 1004 may be performed in any of the ways described herein.

In step 1006, an option is presented to the user to record another subset of the media content instances scheduled for transmission by way of a second content channel in a second resolution. Step 1006 may be performed in any of the ways described herein.

In step 1008, the recording instructions are automatically modified, in response to a selection of the option by the user, to record the other subset of the media content instances scheduled for transmission by way of the second content channel in the second resolution. Step 1008 may be performed in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a computer-readable medium, or combinations of tangibly embodied computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
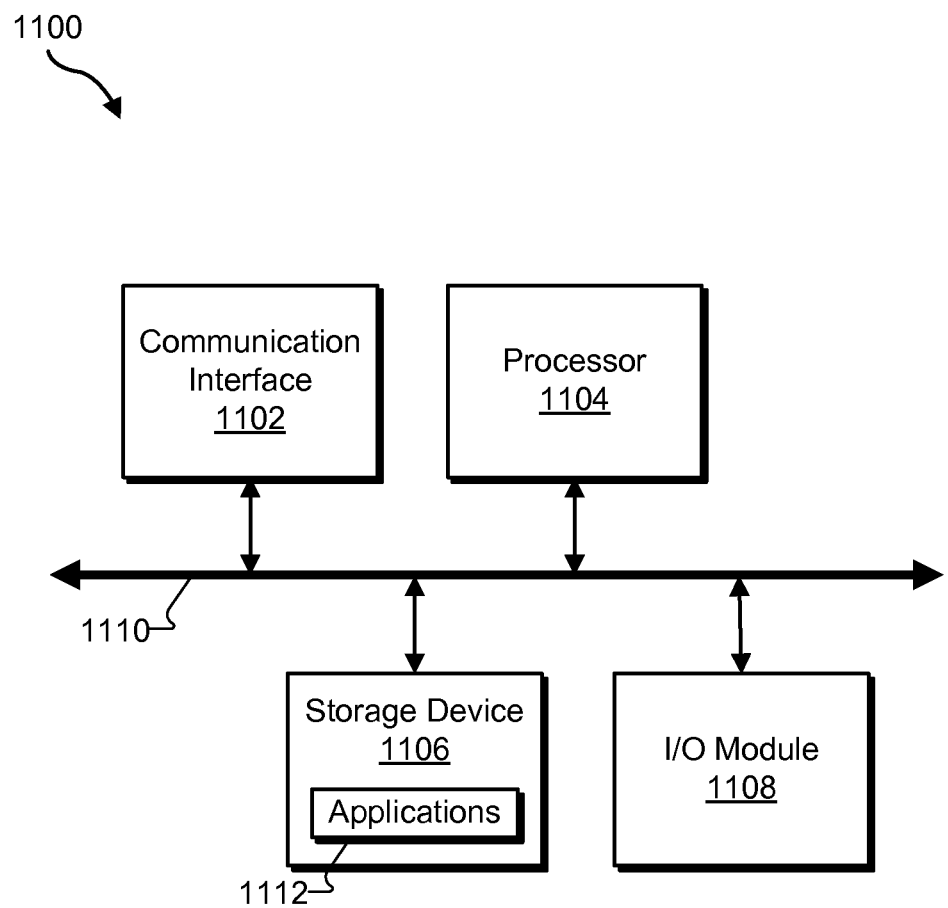
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with recording schedule management facility 102, presentation facility 104, and/or DVR facility 106. Likewise, storage facility 108 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by a media content recording system, recording instructions received from a user to automatically record a first resolution version of a media content instance scheduled to be transmitted during a first time period by way of a first content channel;
   automatically determining, by the media content recording system and in response to the recording instructions being received from the user to automatically record the first resolution version of the media content instance, that a second resolution version of the media content instance is scheduled to be transmitted during a second time period by way of a second content channel, wherein a resolution of the first resolution version of the media content instance is different from a resolution of the second resolution version of the media content instance;

receiving, by the media content recording system, a user request to view an amount of available storage space used to store data representative of recorded media content instances;

presenting, by the media content recording system in response to the user request to view the amount of available storage space, an option to the user to record the second resolution version of the media content instance instead of the first resolution version of the media content instance; and automatically modifying, by the media content recording system and in response to a selection of the option by the user, the recording instructions to record the second resolution version of the media content instance instead of the first resolution version of the media content instance.

2. The method of claim 1, further comprising recording, by the recording subsystem, the second resolution version of the media content instance during the second time period in accordance with the modified recording instructions.

3. The method of claim 1, wherein the presenting of the option comprises presenting the option to the user without presenting information descriptive of at least one of the second time period and the second content channel to the user.

4. The method of claim 1, further comprising:
detecting, by the media content recording system, a recording conflict between the second resolution version of the media content instance and another media content instance scheduled for recording during the second time period; and
presenting, by the media content recording system, the user with one or more conflict resolution options configured to resolve the recording conflict.

5. The method of claim 1, wherein the media content instance is included in a series of media content instances each scheduled to be transmitted during a distinct time period by way of the first content channel, and wherein the automatically modifying comprises automatically modifying the recording instructions to record the second resolution version of all of the media content instances included in the series instead of the first resolution version of all of the media content instances included in the series.

6. The method of claim 1, wherein the second time period is substantially the same as the first time period.

7. The method of claim 1, wherein the second time period is different than the first time period.

8. The method of claim 1, wherein the first resolution version of the media content instance comprises a standard definition ("SD") resolution version of the media content instance and the second resolution version of the media content instance comprises one of a high definition ("HD") resolution version and a three-dimensional ("3D") resolution version of the media content instance.

9. The method of claim 1, wherein the first resolution version of the media content instance comprises a high definition ("HD") resolution version of the media content instance and the second resolution version of the media content instance comprises at least one of a standard definition ("SD") resolution version and a three-dimensional ("3D") resolution version of the media content instance.

10. The method of claim 1, embodied as computer-executable instructions on at least one non-transitory computer-readable medium.

11. A method comprising:
receiving, by a digital video recording ("DVR") device, recording instructions from a user to automatically record a series of media content instances scheduled to be transmitted in a first resolution by way of a first content channel;

recording, by the DVR device, a subset of the media content instances in the first resolution;

automatically determining, by the DVR device, that another subset of the media content instances is scheduled for transmission by way of a second content channel in a second resolution that is different from the first resolution;

receiving, by the DVR device, a user request to view an amount of available storage space used to store data representative of recorded media content instances;

presenting, by the DVR device in response to the user request to view the amount of available storage space, an option to the user to record the another subset of the media content instances scheduled for transmission by way of the second content channel in the second resolution; and automatically modifying, by the DVR device and in response to a selection of the option by the user, the recording instructions to record the another subset of the media content instances scheduled for transmission by way of the second content channel in the second resolution.

12. The method of claim 11, wherein the first resolution comprises a standard definition ("SD") resolution version and the second resolution version comprises a high definition ("HD") resolution.

13. The method of claim 11, wherein the first resolution comprises a high definition ("HD") resolution and the second resolution comprises a standard definition ("SD") resolution.

14. A system comprising:
a recording schedule management facility that
maintains recording instructions received from a user to automatically record a first resolution version of a media content instance scheduled to be transmitted during a first time period by way of a first content channel,
automatically determines, in response to the recording instructions being received from the user to automatically record the first resolution version of the media content instance, that a second resolution version of the media content instance is scheduled to be transmitted during a second time period by way of a second content channel, wherein a resolution of the first resolution version of the media content instance is different from a resolution of the second resolution version of the media content instance; and
receives a user request to view an amount of available storage space used to store data representative of recorded media content instances; and
a presentation facility communicatively coupled to the recording schedule management facility and that presents, in response to the user request to view the amount of available storage space, an option to the user to record the second resolution version of the media content instance instead of the first resolution version of the media content instance.

15. The system of claim 14, further comprising a digital video recording facility communicatively coupled to the recording schedule management facility and that records the second resolution version of the media content instance during the second time period in accordance with the modified recording instructions.

16. The system of claim 14, wherein:
the recording schedule management facility detects a recording conflict between the second resolution version of the media content instance and another media content instance scheduled for recording during the second time period; and
the presentation facility presents one or more conflict resolution options configured to resolve the recording conflict.

17. The system of claim 14, wherein the first resolution version of the media content instance comprises a standard definition ("SD") resolution version of the media content instance and the second resolution version of the media content instance comprises a high definition ("HD") resolution version of the media content instance.

18. The system of claim 14, wherein the first resolution version of the media content instance comprises a high definition ("HD") resolution version of the media content instance and the second resolution version of the media content instance comprises a standard definition ("SD") resolution version of the media content instance.

* * * * *